May 24, 1927.　　　　　　　　　　　　　　　　1,629,783
H. FINKLE
CONNECTER
Filed June 29, 1926

H. Finkle
Inventor

By C. A. Snow & Co.
Attorneys.

Patented May 24, 1927.

1,629,783

UNITED STATES PATENT OFFICE.

HARRY FINKLE, OF PHILMONT, NEW YORK.

CONNECTER.

Application filed June 29, 1926. Serial No. 119,408.

This invention aims to provide a novel connecter for joining a conductor to the post of a battery, and the specific improvement contemplated is the provision of means whereby the connecter can be detached readily from the post of the battery when the connecter is corroded on the post.

Figure 1:
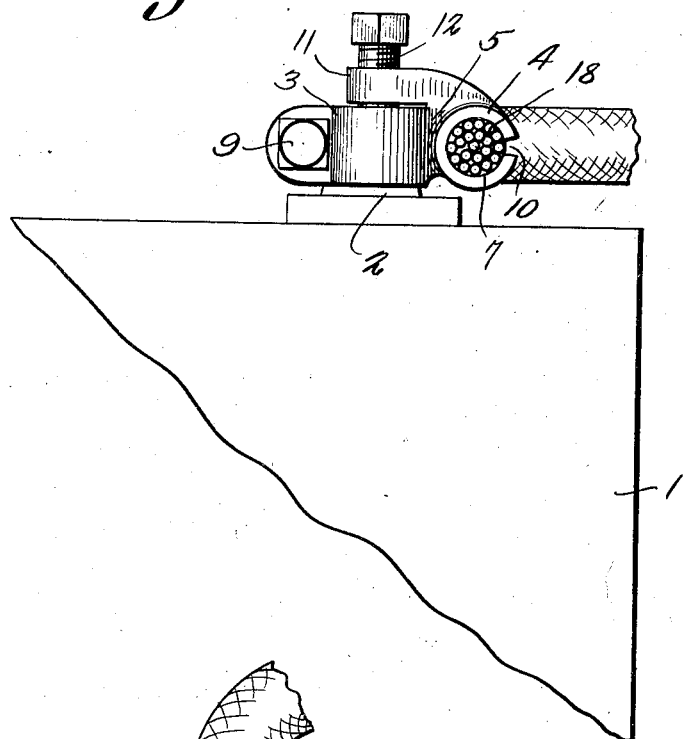
Figure 1 shows in side elevation a battery equipped with the device forming the subject matter of this application.
Figures 2, 3:
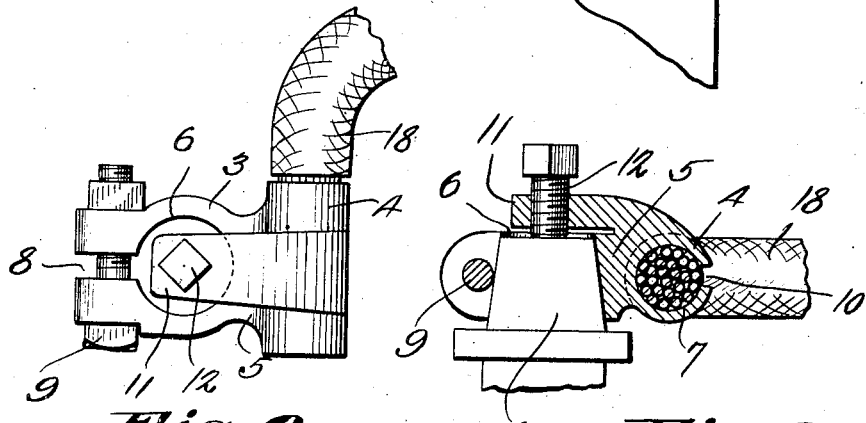
Figure 2 is a top plan of the connecter.
Figure 3 is a section taken through the connecter.

The numeral 1 marks a battery, and generally, a storage battery, supplied with a post 2. The connecter forming the subject matter of this application is made out of metal and includes tubular members 3 and 4, with a section 5 of material joining them, the axes of the tubular members 3 and 4 being disposed at right angles to each other. The tubular member 3 forms a socket 6 for the reception of the post 2, and the tubular member 4 forms a socket 7 for the reception of one end of the conductor 18. The tubular member 3 is divided as at 8 to form jaws which are clamped around the post 2 by any suitable means, such as a bolt 9 passing through the ends of the jaws. The tubular member 4 is divided as at 10 so that it may embrace the end of the conductor 18 closely. An arm 11 is connected at one end to the tubular member 4 and to the part 5, and overhangs the socket 6 which is formed in the tubular member 3, the arm 11 being very close to the upper end of the tubular member 3, as shown in Figure 3. The arm 11 is reduced in width toward its free end, and the free end of the arm 11 does not completely close and cover the socket 6: a statement which will be understood readily when Figure 2 is noted. In the arm 11 is mounted a thrust device adapted to cooperate with the battery post 2, and this thrust device may be in the form of a screw 12 threaded into the arm.

In practical operation, when the bolt 9 is loosened, if the post 2 sticks in the socket 6, due to corrosion or otherwise, the screw 12 may be advanced in the arm 11, the screw bearing on the battery post 2 to dislodge the connecter from the battery post.

What is claimed is:—

1. A connecter of the class described, comprising means for holding a conductor, and comprising a socket for a battery post, the connecter being supplied with an arm overhanging the socket, and a thrust member movable in the arm and adapted to cooperate with a battery post to dislodge the connecter therefrom.

2. A device of the class described, constructed as set forth in claim 1, and further characterized by the fact that the thrust device consists of a screw threaded into the arm.

In testimony that I claim the foregoing as my own, I have hereto affixed my signature.

HARRY FINKLE.